(No Model.)
J. T. LATCHAW.
NUT LOCK.
No. 380,494.              Patented Apr. 3, 1888.
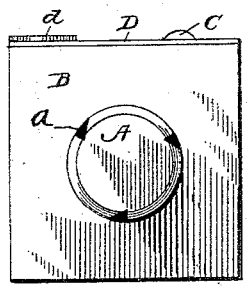
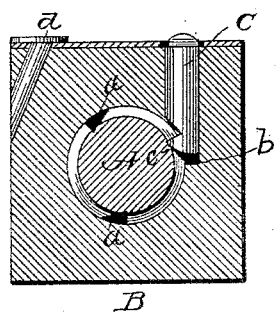 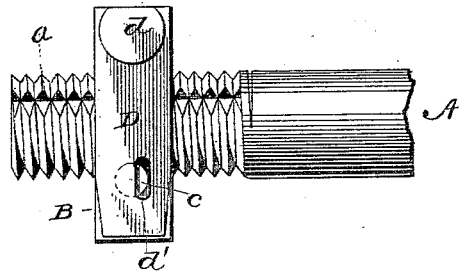
Witnesses:
Inventor:
Jacob T. Latchaw,
by
his Attorney.

UNITED STATES PATENT OFFICE.

JACOB T. LATCHAW, OF BRADFORD, PENNSYLVANIA.

NUT-LOCK.

SPECIFICATION forming part of Letters Patent No. 380,494, dated April 3, 1888.

Application filed February 4, 1887. Serial No. 226,499. (No model.)

*To all whom it may concern:*

Be it known that I, JACOB T. LATCHAW, a citizen of the United States, residing at Bradford, in the county of McKean and State of Pennsylvania, have invented certain new and useful Improvements in Nut-Locks; and I do hereby declare the following to be a full, clear, and exact description of the invention, such as will enable others skilled in the art to which it appertains to make and use the same.

My invention relates to nut-locks.

The object is to prevent the unscrewing of the nuts of bolts used in fish-joints, railroad-cars, carriages, and other devices subjected to a jarring vibratory action.

The invention consists in the construction and novel combination of parts hereinafter set forth.

In the accompanying drawings I have illustrated an embodiment of my invention, in which—

Figure 1 is an end view of a nut and bolt, showing the arrangement of the flat spring. Fig. 2 is a sectional view of the same, showing the locking-pin in engagement with the grooved bolt. Fig. 3 is a plan view showing the slot in the flat spring.

A represents the bolt, through the threaded end of which are provided a series of longitudinal grooves, *a*, one side of the groove being on the line of diameter of the bolt, the other being at about right angles thereto, thus making an abrupt and a gradually-inclined side.

The nut B is here represented as square, but may be of any of the ordinary forms of nut in use, and is constructed with a bore or cavity, *b*, arranged longitudinally to the thread of the nut, and extending about half-way through the same. Within this cavity is arranged a locking-pin, C, preferably cylindrical in form and having the inner side of its lower end cut away, as shown, leaving a hook-like projection, *c*, which engages with one of the longitudinal grooves in the bolt A, the abrupt and gradually-inclined sides of the grooves being so placed in relation to the projection upon the end of the locking-pin that when the nut is being screwed upon the bolt the locking-pin will be raised by the gradually-inclined side of the groove; but should the nut be turned in the direction necessary for its removal from the bolt the projection upon the end of the locking-pin will at once engage with the opposite side of the groove and prevent its movement.

To prevent displacement of the locking-pin and insure its immediate action, a flat spring, D, is fastened upon the side of the nut by a rivet, *d*, its opposite end having a small slot, *d'*, which fits over a slight projection extending above the upper end of locking-pin, the spring bearing upon the shoulder formed by said projection, which keeps the locking-pin always closely pressed against the bolt. To insert the locking-pin in the cavity in the nut the flat spring is turned aside, the pin inserted, and the spring again lifted back, allowing the projection upon the top of the pin to protrude through the slot, thus preventing the rotation of the locking-pin in its recess.

It will readily be seen that in a nut-lock constructed as herein described all possibility of accidental detachment of the nut is prevented. The locking-pin having fallen into engagement with the abrupt side of the groove in the screw-bolt, any power exerted upon the nut to turn it in a direction necessary for its removal from the bolt will only serve to bind the pin more firmly within the groove.

Having thus described my invention, what I claim as new, and desire to secure by Letters Patent, is—

The combination, with a nut provided with a cavity or recess, *b*, tangential to the thread of the nut and extending only part way through, of a locking-pin cut transversely near its inner end to form a hook-like projection thereon, said locking-pin extending nearly to the inner end of the recess or cavity in the nut, which end provides an abutment for the pin, a pivoted spring secured to the edge of the nut and engaging the head of the locking-pin, and a screw-bolt having longitudinal grooves *a* intersecting its threads, substantially as specified.

In testimony whereof I affix my signature in presence of two witnesses.

JACOB T. LATCHAW.

Witnesses:
R. G. DYRENFORTH,
W. W. MORTIMER.